Nov. 3, 1931.　　　T. W. BARBER　　　1,830,633

MIXING GASES AND LIQUIDS

Filed Sept. 9, 1929

Inventor
Thomas Walter Barber

Patented Nov. 3, 1931

1,830,633

UNITED STATES PATENT OFFICE

THOMAS WALTER BARBER, OF AVERLEY, LONDON, ENGLAND

MIXING GASES AND LIQUIDS

Application filed September 9, 1929, Serial No. 391,466, and in Great Britain October 8, 1928.

The object of this invention is to obtain an intimate admixture of gases, or gases and liquids.

In many industries it is necessary to mix gases, or gases and liquids, for purposes of combination, oxidation, clarification, precipitation and the like.

Some gases are only absorbed slowly or with difficulty into a liquid, and, in the cases of liquids of high viscosity, specific gravity or temperature, intimate admixture with a gas, or another liquid, is often almost impossible under practical conditions.

This invention relates to a method and means whereby intimate admixture may be obtained under all circumstances.

It consists essentially in the presentation of one fluid in the form of a thin film, into which, as it passes, the other fluid is injected, in the form of fine jets or sprays.

Figure 1:
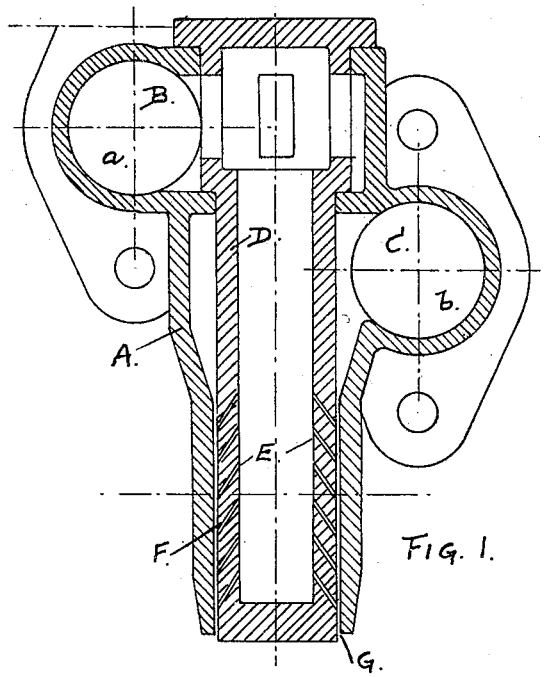
Figure 3:
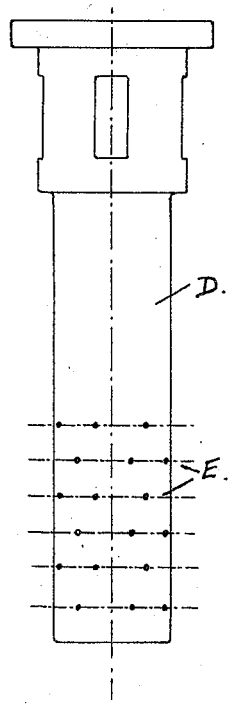
Figure 2:
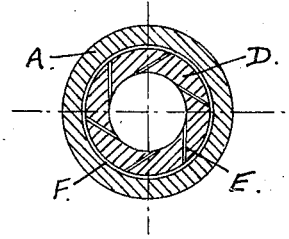

An example of a suitable form of apparatus for the application of this invention is shown in the accompanying drawings, Figs. 1, 2 and 3. Figs. 1 and 3 show an apparatus for mixing fluids. Fig. 2 is a section on the line XY of Fig. 1.

An external casing A, Figs. 1 and 2, is divided into two chambers, B and C', into which the fluids $a$ and $b$, to be mixed, are introduced separately. Where one fluid is a liquid, it is introduced, preferably, into C'.

The chamber B communicates with an internal tube D, Figs. 1 and 3, which extends through the chamber C', and which is perforated with small orifices E. The chamber C' is extended so as to surround the tube D, leaving a thin annular space F between the two.

The fluid $a$ passes into the tube D and through the orifices E into the annulus F, in the form of fine jets or sprays. The fluid $b$ passes through the annulus F in the form of a film, into which the jets of $a$ impinge.

The orifices E may be directed towards the outlet G, as shown in Fig. 1. They may also be oriented tangentially, as shown in Fig. 2, so as to give a spiral motion to the fluid $b$, as it passes—in order to increase the intensity of the mixing effect and to bring all parts of the film under the action of the jets issuing from the orifices.

Where one or more corrosive fluids are to be manipulated, the apparatus is constructed of suitably resistant material, or lined with such material.

It is obvious that this apparatus may be utilized in series and that more than two fluids may, by that means, be mixed.

I claim:—

1. The method of mixing two fluids, consisting in the presentation of one fluid in the form of a structurally indestructible film and maintaining it in this form while the other fluid is progressively introduced into it in a finely divided form.

2. Apparatus for mixing two fluids, comprising two chambers each fed by one of the fluids, respectively; the walls of the said chambers being so disposed in, or against, each other as to create a thin space between them; such space being relatively of considerable length and area and fed by one of the fluids; into which space open a large number of small orifices fed by the second fluid, which second fluid is thus progressively introduced into the first fluid as it passes.

3. Apparatus according to claim (2) in which the orifices are so oriented that their axes are directed towards the outlet of the apparatus.

4. Apparatus according to claim (2) in which the orifices ore oriented tangentially, in order to provoke a lateral displacement of the fluids to be mixed.

5. Apparatus according to claim (2) in which a number of orifices have their axes directed towards the outlet of the apparatus and a number are oriented tangentially.

THOMAS WALTER BARBER.